Sept. 20, 1966 R. M. EMANUELSON 3,274,526

INSULATING CORE TRANSFORMERS

Filed July 17, 1963 2 Sheets-Sheet 1

INSULATING CORE TRANSFORMERS

Filed July 17, 1963 2 Sheets-Sheet 2

United States Patent Office 3,274,526
Patented Sept. 20, 1966

3,274,526
INSULATING CORE TRANSFORMERS

Roy M. Emanuelson, Reading, Mass., assignor to High Voltage Engineering Corporation, Burlington, Mass., a corporation of Massachusetts Filed July 17, 1963, Ser. No. 295,698
8 Claims. (Cl. 336—60)

This invention relates generally to electromagnetic generators of the type adapted to provide high power outputs at high electrical potentials. More specifically, there are comprehended novel improvements that effect appreciable reductions in weight, cost, and operating temperature of such devices.

High power electrical transformers are conventionally enclosed within a hermetically sealed grounded metallic tank. The high potential developed in such a device is maintained in electrical isolation within the tank by means of graded insulators and an environment of pressurized insulating fluid. An insulating bushing, usually of porcelain, is used to bring a conductor through the ground plane of the metal tank whereby the high power therein developed may be utilized. With the current trend towards higher potential devices these prior art designs and techniques are becoming ineffective. Scaling up the tank and bushings to meet the increased size and electrical stresses of transformers in the one million volt range and larger, results in equipment that is unwieldy and expensive. Furthermore, increased power demands result in higher internal operating temperatures. The use of fans alleviate this problem to some extent. However, the cooling of certain equipment in which the area available for conduction cooling is small compared to the volume of material to be cooled, remains a problem. It is toward the solution of this problem and in particular the problem of providing adequate cooling in the so-called insulating core transformers hereinafter described that the present invention is primarily directed.

Accordingly, it is a principal object of this invention to provide a new and improved high potential electromagnetic high voltage generator.

It is another object of this invention to provide apparatus of the class described having new and improved cooling means whereby more efficient operation at higher power levels can be achieved.

And still another object of this invention is to provide such a non-metallic generator tank having discrete physical geometry and electrical characteristics adapted to permit elimination of the large high potential output bushing required in prior art devices.

These, together with other objects and features of this invention will become more readily apparent from the following detailed description. Although the novel improvements comprehended are herein described as applied to specific apparatus, it is to be understood that the same is by way of illustration only. The principles of the invention are equally applicable to a varity of electromagnetic devices and many adaptations and alterations can be made without departing from the spirit or scope thereof.

In order that all of the structural features for attaining the objects of this invention may be readily understood, reference is made to the accompanying drawings in which like elements are given like reference numerals throughout and wherein.

Figures 1, 2, 3:
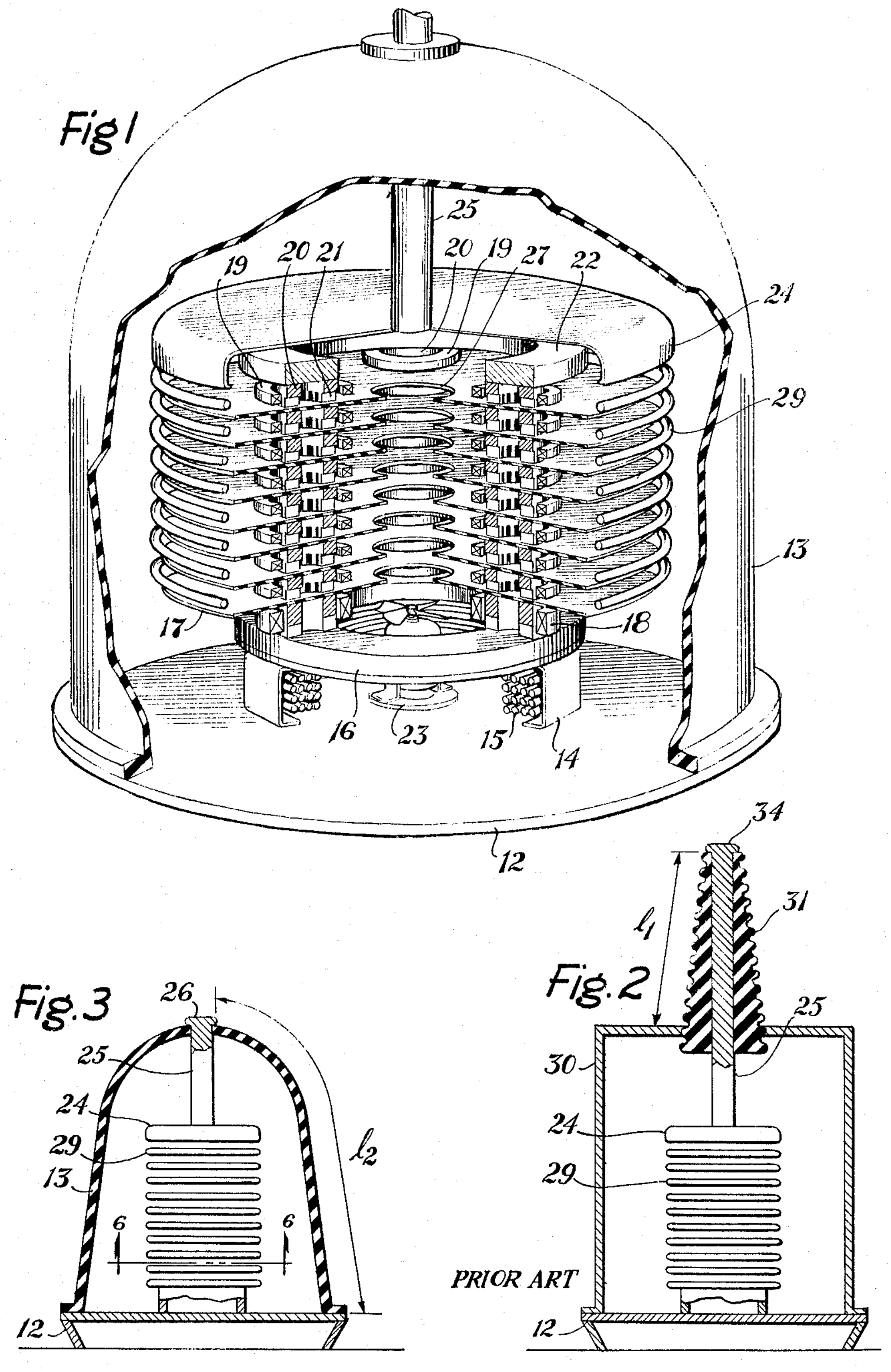
FIGURE 1 is a partially cut away isometric view of a high voltage device employing the improvements comprehended by this invention.
FIGURE 2 is a view partially in section of a conventional device illustrating the current state of the art.
FIGURE 3 is a view partially in section of the device of FIGURE 1 illustrating the non-metallic tank comprehended by this invention.

Referring now to FIGURE 1 there is illustrated high voltage apparatus 11 embodying the novel improvements of this invention. In general the device is a three phase transformer and includes three primary coils 18, a plurality of secondary coils 19 associated with each primary coil; and a magnetic circuit. The magnetic circuit comprises annular members 16 and 22 and the stacks of coil core segments 20, which segments are separated by thin insulating sheets 17. A plurality of voltage gradient hoops 29 are positioned between a high voltage terminal 24 and the grounded base plate 12. Electromagnetic generators of this type are known as insulating core transformers and are described in detail in the U.S. patent application of R. J. Van de Graaff entitled High Voltage Electromagnetic Apparatus Having an Insulating Magnetic Core, S.N. 647,915, filed March 22, 1957, now abandoned, and assigned to the assignee of the present patent application.

The nonmetallic tank feature of this invention is best described in conjunction with FIGURES 2, 3, 4 and 5. FIGURE 2 illustrates the current state of the art of the class of electrical high potential device comprehended by this invention. In such a device a high potential is developed on a high voltage terminal 24, and utilization of this high potential is achieved through conductor 25. Metallic tank 30 is at ground potential and hermetically seals the transformer in an atmosphere of insulating gas. A bushing 31, usually of porcelain, is used to bring the high potential conductor 25 through the ground plane of the metal tank and also to insulate the output terminal 34 from the tank. For devices in the 500 kv. range and smaller such an arrangement is generally practicable. However, if higher voltages are generated, the concommitant increase is physical size required means that very large, heavy, and expensive tanks must be used. Furthermore the porcelain bushing 31 must be made extremely large. This is so not only because of the severe electrical stresses at the point where conductor 25 passes through the ground plane of the metallic tank, but also because the creepage path $l_1$ between the output terminal 34 and the tank must be greatly increased at higher voltages.

In accordance with the principles of this invention, the above stated problems encountered at very high potentials are obviated by the use of a nonmetallic tank of the type illustrated in FIGURE 3. The nonmetallic tank 13 may be of a plastic such as polyethylene, or fiberglass, or other suitable nonmetallic material and should be of sufficient thickness and rigidity to contain a pressurized insulating gas atmosphere without distortion should a pressurized insulating gas be required. It can be readily seen from the geometry of the device of FIGURE 3 that the plastic tank 13 now takes the place of both the metal tank and the bushing of the device of FIGURE 2. In addition, the creepage path $l_2$ between the output terminal 26 and the grounded base 12 is now much longer than the creepage path $l_1$ of the prior art device. Furthermore, the severe electrical stresses encountered in passing the high voltage through the grounded metal tank of FIGURE 2 are not a factor with the nonmetallic tank.

Figures 4, 5, 6, 7, 8, 9:
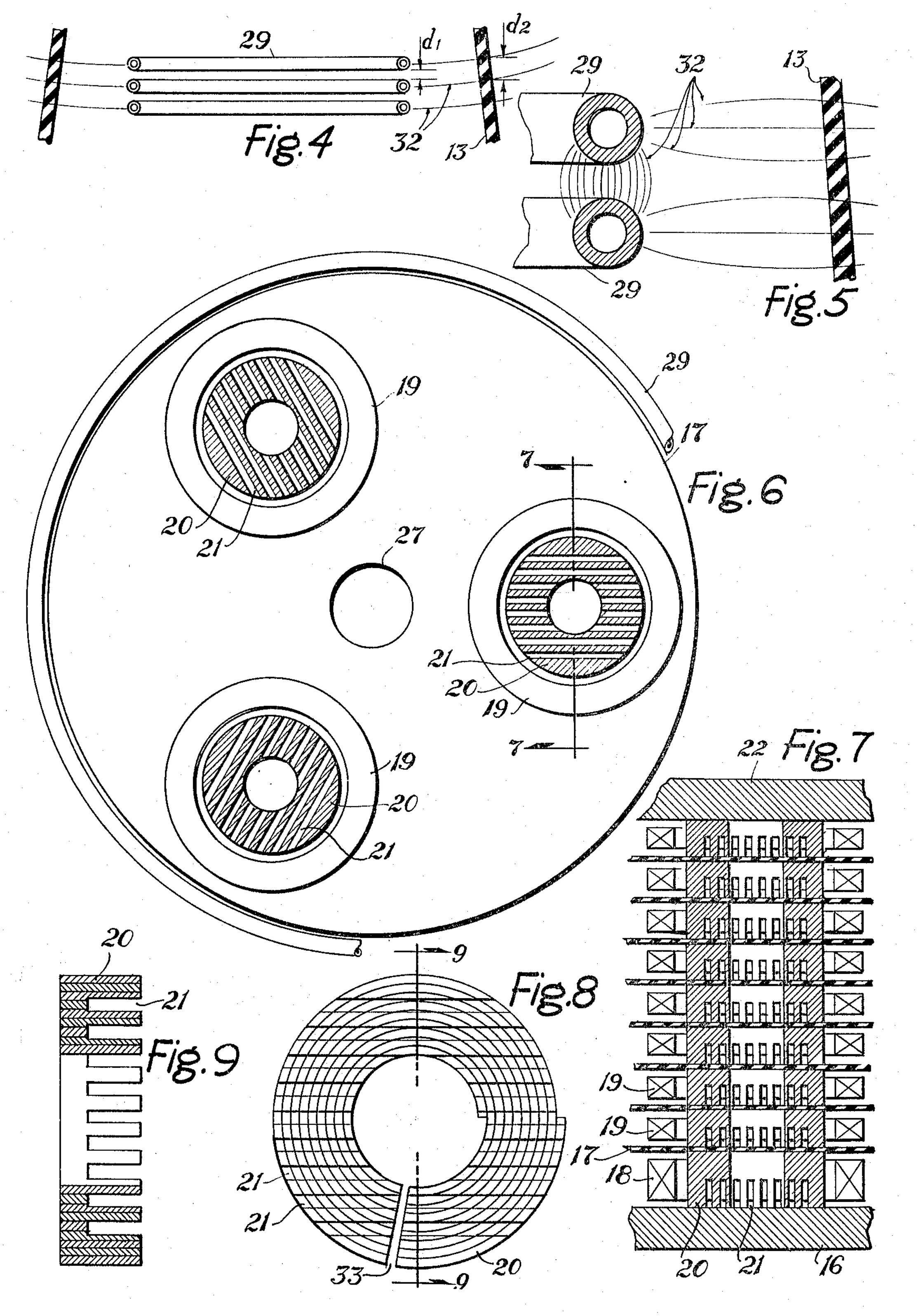
FIGURES 4 and 5 are details illustrating the flux distribution and electrical stresses associated with the voltage gradient hoops of the device of FIGURE 1.
FIGURE 6 is a partial section taken at 6—6 of FIGURE 3.
FIGURE 7 is a partial section taken at 7—7 of FIGURE 6.
FIGURE 8 illustrates one of the core segments of the magnetic circuit of the device of FIGURE 1.
FIGURE 9 is a section taken at 9—9 of FIGURE 8.

FIGURES 4 and 5 illustrate the manner in which the non-metallic tank effectively maintains the voltage gradients associated with the electrical apparatus enclosed thereby within operable limits. Because of the insulating gas atmosphere within the tank, electrical components having different potentials can be placed much closer than would be the case in air. Consequently, voltage gradient hoops 29 are separated by a relatively short space $d_1$ thus reducing the overall size of the device. Because the hoops 29 are circular in cross-section, the field distribution is concentrated between adjacent hoops as indicated by field lines 32. However, the insulating gas prevents this concentrated field from resulting in voltage breakdown between hoops. The equipotential lines emanating from the voltage gradient hoops are separated by some space $d_2$ at the outer surface of the tank. Since the distance $d_2$ is greater than the distance $d_1$, and since the field on the outer surface of the tank is evenly distributed, there is no possibility of voltage breakdown even though the outer surface of the tank is exposed to the atmosphere.

The apparatus thus described is preferably surrounded by a grounded metal fence (not shown). The maximum radial voltage gradient at the outside surface of the tank can be determined by the equation:

$$G=\frac{V}{rl_n\frac{r_2}{r_1}}$$

where $G$=the maximum radial voltage gradient at the outside surface of the nonmetallic tank;

$r$=the radius of the nonmetallic tank;

$r_1$=the radius of the transformer;

$r_2$=the radius of the grounded fence; and $V$=the maximum voltage generated by the transformer.

The design of any particular nonmetallic tank is therefore accompished by determining the rated voltage and dimensions of the transformer to be enclosed, deciding on a permissible outside surface voltage gradient, and then calculating from the above formula the tank radius.

Another feature of this invention that is directed toward maintaining lower operating temperatures and obtaining higher power outputs for any given device is illustrated in detail by FIGURE 1 and FIGURES 6 through 9. This feature comprehends establishing cooling ducts in the transformer core sections of the magnetic circuit, providing fluid cooling means within the tank, and circulating the insulating fluid residing therein through the ducts and through the cooling means. In the particular device of FIGURE 1 there are three such core sections displaced 120° from each other with respect to the center of the transformer. The cooling ducts 21 of each such core are oriented in parallel relationship to radii of the transformer. Each transformer core section comprises a stack of segments 20 as illustrated in FIGURE 7. The segments 20 are fabricated in the following manner. A strip of permeable material is wound into an annular member such as that of FIGURE 8. The adjacent strips are bonded together by any conventional means and the segment is annealed to remove any tendency to spring apart. A slot 33 is then cut entirely through one side of the segment to prevent the introduction of a short circuited turn into the magnetic circuit. The segment, because of its strip construction is in effect highly laminated and has the advantage of greatly reducing eddy currents. Finally, a plurality of parallel ducts or slots 21 are milled into one surface of the segment. The segments thus fabricated are then stacked between top magnetic circuit annular member 22 and bottom magnetic circuit annular member 16. Each such segment is insulated from adjacent segments by an insulating sheet 17. One insulating sheet 17 may be used to insulate corresponding segments on each of the three core stacks as illustrated in FIGURE 6. In such an arrangement, an aperture 27 is provided in the center of each insulating sheet. The transformer secondary coils 19 are not as thick as the segments 20 and are spaced therefrom as illustrated in FIGURE 7, and therefore do not materially affect or restrict the flow of fluid circulating through the ducts 21.

Referring again to FIGURE 1, the organization of the cooling system is as follows. The transformer is supported a distance off the base plate 12 by means of support legs 14. Cooling coils 15 are disposed within said support legs and form an annular ring substantially coinciding with magnetic circuit member 16. A fan 23 is disposed on the base plate 12 and arranged to force the insulating gas up through the series of apertures 27. The free flow of the insulating gas is arrested by the high voltage terminal 24 however, and is forced to flow between the layers formed by insulating sheets 17. An insulating gas circulating flow pattern is thus established whereby it passes up through apertures 27, radially out through ducts 21, down the sides of the tank, through the rows of cooling coils 15 and finally back through the fan 23. It is apparent that the insulating gas circulating in this manner will remove much of the heat generated in the magnetic circuit. A similar arrangement could be employed in a single phase device with the exception that the fan would be positioned to force the insulating gas up through the center of the core stack.

It is to be understood that the above-described arrangements are illustrative of the applications of the principles of this invention are not to be taken in a limiting sense. Numerous other arrangements may be devised by those skilled in the art without departing from the scope of the invention.

Having thus described the invention, what is claimed as new and desired to be secured by Letters Patent is:

1. An electromagnetic transformer comprising at least one primary coil, at least two secondary coils serially arranged in operable relationship with each primary coil, a closed magnetic circuit including a plurality of grooved core segments of permeable material, there being at least one core segment associated with each secondary coil, means for insulating each core segment from adjacent segments, a hermetic non-metallic tank enclosing said electromagnetic transformer, a pressurized insulating gas atmosphere residing therein, fluid cooling means disposed within said tank, and means for circulating said insulating gas atmosphere through the grooves of said core segments and through said fluid cooling means, said grooves extending through each core segment in a direction transverse to the direction of the magnetic flux in said core segment.

2. Apparatus as defined in claim 1 wherein said tank is fabricated of polyethylene.

3. Apparatus as defined in claim 1 wherein said tank is fabricated of fiberglass.

4. In combination with electrical apparatus having a high potential output and having windings about at least one core comprising core segments having insulation therebetween extending across the direction of the magnetic flux produced by said windings and having grooves therein, said grooves extending through each core segment in a direction transverse to the direction of the magnetic flux in said core segment, a hermetically sealed tank member having means passing through the apex thereof for communicating the high potential generated therein to an externally disposed high voltage terminal, said tank member being fabricated of electrically insulating material and presenting a length of electrical insulation between the high voltage terminal and ground which is substantially longer than the shortest path therebetween.

5. Apparatus as defined in claim 4 wherein said tank is fabricated of polyethylene.

6. Apparatus as defined in claim 4 wherein said tank is fabricated of fiberglass.

7. A containing tank for high voltage electrical apparatus comprising windings about at least one core comprising core segments having insulation therebetween extending across the direction of the magnetic flux produced by said windings and having grooves therein, said grooves extending through each core segment in a direction transverse to the direction of the magnetic flux in said core segment, said tank comprising a grounded base plate and a cover member of insulating material, said base plate and said cover member cooperating to enclose hermetically said electrical apparatus, which electrical apparatus has a high voltage terminal separated from said grounded base plate by a plurality of voltage gradient hoops, and said cover member presenting a length of electrical insulation between the high voltage output of said electrical apparatus and said metallic base plate which is substantially longer than the shortest path therebetween and over which the electric field is evenly distributed so that as the equipotential lines emanating from said voltage gradient hoops pass through said tank member they are more separated than at said voltage gradient hoops.

8. In combination with a high potential electromagnetic generator enclosed in a hermetically sealed insulating gas environment and having primary and secondary transformer coils wound about at least one core comprising transformer coil core members electrically insulated from one another along the direction of the magnetic flux produced by said coils and having grooves therein, fluid cooling means disposed within said hermetically sealed gas environment, and means for circulating said insulating gas through said grooves and through said cooling means, said grooves extending through each core segment in a direction transverse to the direction of the magnetic flux in said core segment.

References Cited by the Examiner

UNITED STATES PATENTS

| | | | |
|---|---|---|---|
| 2,407,420 | 9/1946 | Hartmann | 336—94 X |
| 2,816,947 | 12/1957 | Leightner et al. | 336—94 X |
| 2,858,356 | 12/1958 | Setchell | 336—90 X |
| 2,942,213 | 6/1960 | Camilli et al. | 336—57 X |
| 3,173,113 | 3/1965 | Benke | 336—60 |

LEWIS H. MYERS, *Primary Examiner.*

JOHN F. BURNS, ROBERT K. SCHAEFER, *Examiners.*

T. J. KOZMA, *Assistant Examiner.*